(12) United States Patent
Rice

(10) Patent No.: US 9,778,034 B2
(45) Date of Patent: Oct. 3, 2017

(54) COMBINATION LEVEL AND RIGHT ANGLE MEASURING TOOL

(71) Applicant: Walter Wells Rice, Gambrills, MD (US)

(72) Inventor: Walter Wells Rice, Gambrills, MD (US)

(73) Assignee: Walter Wells Rice, Gambrills, MD (US)

( * ) Notice: Subject to any disclaimer, the term of this patent is extended or adjusted under 35 U.S.C. 154(b) by 0 days.

(21) Appl. No.: 15/078,694

(22) Filed: Mar. 23, 2016

(65) Prior Publication Data

US 2016/0282114 A1 Sep. 29, 2016

Related U.S. Application Data

(60) Provisional application No. 62/177,684, filed on Mar. 23, 2015.

(51) Int. Cl.
*G01C 15/12* (2006.01)
*G01C 9/34* (2006.01)

(52) U.S. Cl.
CPC .............. *G01C 9/34* (2013.01); *G01C 15/12* (2013.01)

(58) Field of Classification Search
CPC .................................................. G01C 15/12
See application file for complete search history.

(56) References Cited

U.S. PATENT DOCUMENTS

| | | | |
|---|---|---|---|
| 2,998,655 A | | 9/1961 | White |
| 3,293,752 A | * | 12/1966 | Shuman ............... B25H 7/00 33/27.03 |
| 4,566,198 A | * | 1/1986 | Vitale ................. G01B 3/1041 242/388.6 |
| 4,761,890 A | | 8/1988 | Morrell |
| 5,459,935 A | | 10/1995 | Paulson |
| 5,713,135 A | | 2/1998 | Acopulos |
| 6,202,312 B1 | * | 3/2001 | Rando ................. G01C 15/004 33/227 |
| RE38,032 E | * | 3/2003 | Butwin ................. G01B 3/566 33/460 |
| 6,880,261 B1 | * | 4/2005 | Abbey ............... E04G 21/1833 33/1 G |
| 7,305,773 B2 | | 12/2007 | Hios |
| 7,562,463 B2 | | 7/2009 | Vaes |
| 7,854,070 B1 | | 12/2010 | Vajentic |
| 7,882,643 B1 | | 2/2011 | Portinen |
| 9,360,289 B2 | | 6/2016 | Harris |
| 2005/0283987 A1 | * | 12/2005 | Nash ................... G01C 15/002 33/286 |

(Continued)

OTHER PUBLICATIONS

"Melchisedech Thevenot," Wikipedia.

*Primary Examiner* — Charlie Y Peng

(57) ABSTRACT

Through its unique trapezoidal shape and strategically placed vials, the combination level and right angle measuring tool requires only one user to not only quickly verify if a long object is horizontal or vertical but also to easily determine if the angle of the intersection of two long objects is 90 degrees. To obtain the right angle measurement, the combination level and right angle measuring tool employs the 3-4-5 rule (an application of the Pythagorean Theorem, where $a^2+b^2=c^2$) in its design, eliminating the need for lasers or movable parts.

1 Claim, 13 Drawing Sheets

(56) References Cited

U.S. PATENT DOCUMENTS

2007/0028474 A1* 2/2007 Dickey .................... B25H 7/00
                                                      33/427
2013/0263460 A1* 10/2013 Varney .................... B25H 7/02
                                                      33/405

* cited by examiner

COMBINATION LEVEL AND RIGHT ANGLE MEASURING TOOL

REFERENCES CITED

U.S. Patent Documents

| Pat. No. | Code | Date of Patent | Inventor(s) | Classification/ Subclassification |
|---|---|---|---|---|
| 2,998,655 | A | September 1961 | White | 33/340 |
| 4,761,890 | A | August 1988 | Morrell | 33/473 |
| 5,459,935 | A | October 1995 | Paulson et al. | 33/451 |
| 5,713,135 | A | February 1998 | Acopulos | 33/451 |
| 7,305,773 | B2 | December 2007 | Hios | 33/429 |
| 7,562,463 | B2 | July 2009 | Vaes | 33/374 |
| 7,854,070 | B1 | December 2010 | Vajentic | 33/417 |
| 7,882,643 | B1 | February 2011 | Portinen | 33/474 |
| 9,360,289 | B2 | June 2016 | Harris | 33/342 |

TECHNICAL FIELD

The present invention relates to construction tools, specifically spirit levels (also known as bubble levels) and framing squares (also known as steel squares).

BACKGROUND ART

Melchisédech Thévenot invented the spirit level in circa 1661. While the spirit level has evolved over time, its basic components and simplicity have remained the same, attesting to its practicality. Notwithstanding more cutting-edge means for measuring for horizontalness and verticalness, the spirit level continues to be a popular and necessary tool among the construction trades, equal in utility to the hammer and saw.

As with other common tools, additions to the spirit level have increased its usefulness by making it a multipurpose tool. Because of their related functions, a number of inventions have combined the capabilities of a spirit level and a framing square into one tool.

In 1961, T. White (U.S. Pat. No. 2,998,655) obtained a patent for a "leveling square." In 1988, M. Morrell (U.S. Pat. No. 4,761,890) obtained a patent for a tool that "combines the features of a square [and] a level." In 1995, E. Paulson and G. Paulson (U.S. Pat. No. 5,459,935) obtained a patent for "a combination tool . . . including a square [and] a level." In 1998, B. Acopulos (U.S. Pat. No. 5,713,135) obtained a patent for a tool that "combines the functions of a framing square [and a] level." In 2007, R. Hios (U.S. Pat. No. 7,305,773) obtained a patent for a "combination square tool with an integrated level." In 2009, E. Vaes (U.S. Pat. No. 7,562,463) obtained a patent for "a combination level and square." In 2010, M. Vajentic (U.S. Pat. No. 7,854,070) obtained a patent for "a square" that contains "spirit levels." In 2011, B. Portinen (U.S. Pat. No. 7,882,643) obtained a patent for "a square and [a] leveling tool." In 2016, C. Harris (U.S. Pat. No. 9,360,289) obtained a patent for "a multipurpose squaring and leveling tool."

C. Harris' invention (U.S. Pat. No. 9,360,289) comprises "a generally trapezoidal body, angled corners, and leveling inserts" and "allows for the squaring and leveling of joints around obstacles which may present barriers to traditional squaring tools." C. Harris' invention also comprises "a substantially straight angled first end disposed approximately 45 degrees adjacent from the first straight edge" and "a substantially straight angled second end disposed approximately 45 degrees adjacent from the first straight edge."

Although there are some similarities, in particular C. Harris' invention (U.S. Pat. No. 9,360,289), none of the prior art matches the purpose or closely resembles the design of the present invention.

SUMMARY OF INVENTION

Technical Problem

Common practices in the construction field include quickly determining if a long object, e.g., framing member, is horizontal or vertical and if the intersection of two long objects is 90 degrees. However, to obtain both measurements has usually required the use of more than one tool and sometimes more than one individual, an inefficient process.

Solution to Problem

A combination level and right angle measuring tool (hereinafter, the "combination measuring tool") effectively addresses this problem. The combination measuring tool incorporates the basic features and capabilities of a spirit level and the right angle measuring abilities of a framing square into one device. The combination measuring tool requires only one user to quickly measure long objects, i.e., 5 feet or longer, for levelness and verticalness and to quickly measure two long intersecting objects, i.e., each 5 feet or longer, for perpendicularity, both horizontally and vertically.

Advantageous Effects of Invention

The combination measuring tool adds to the performance of a spirit level and addresses the short distance limitations of a framing square for measuring right angles through its unique trapezoidal shape and its strategically placed vials. The design of the combination measuring tool is intended to apply the easily remembered 3-4-5 rule, which is an application of the Pythagorean Theorem, where $a^2+b^2=c^2$; as applied herein, $3^2+4^2=5^2$ or $9+16=25$. The combination measuring tool also alleviates the need for additional measuring devices, e.g., a tape measure, to perform the 3-4-5 rule. To assist in its use, the combination measuring tool is imprinted with ample visual aids, i.e., numbered markings and directional arrows on its first and second sides and numbered first and second edges. The combination measuring tool contains no lasers or movable parts.

BRIEF DESCRIPTION OF DRAWINGS

The following list is a brief description of the drawings.

DESCRIPTION OF EMBODIMENTS

Design

Figure 1:
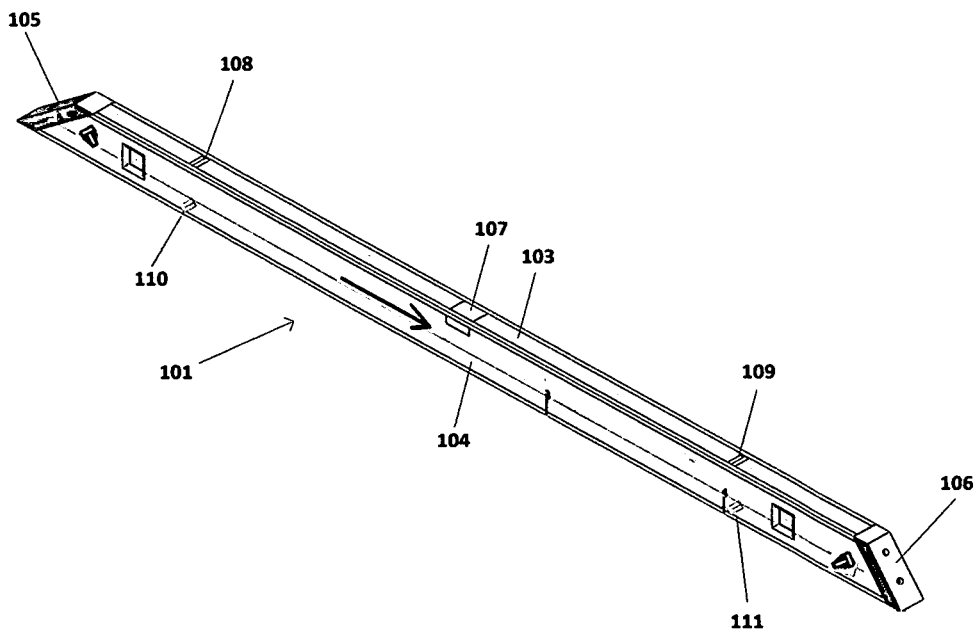
FIGS. 1 and 2 are isometric views of the combination measuring tool, indicating its first and second sides, respectively; its top and bottom edges; and its first and second edges, respectively.

As shown in FIGS. 1 to 4, the combination measuring tool has a first side 101 and a second side 102. As shown in FIGS. 1 to 4, the second side 102 duplicates the first side 101.

As shown in FIGS. 1 to 4, the combination measuring tool resembles an elongated trapezoid: The top 103 and bottom 104 edges are parallel and unequal in length, and the two (first 105 and second 106) edges are oblique and unequal in length.

Figure 5:
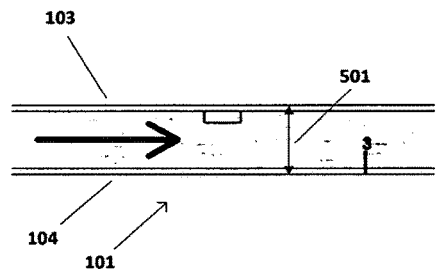
FIG. 5 is a partial view of the first side of the combination measuring tool, indicating its height.
Figure 6:
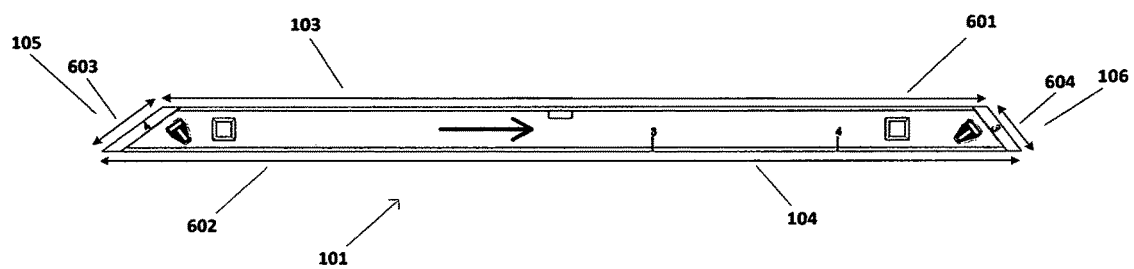
FIG. 6 is a view of the first side of the combination measuring tool, indicating the lengths of its top and bottom edges and its first and second edges.
Figure 7:
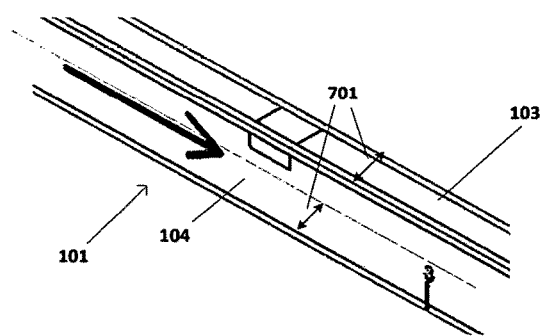
FIG. 7 is an isometric partial view of the combination measuring tool, indicating the width of its top and bottom edges.

As shown in FIG. 5, the combination measuring tool is 3 inches high 501 from the bottom edge 104 to the top edge 103. As shown in FIG. 6, the top edge 103 is 53¾ inches long 601 and the bottom edge 104 is 5 feet (60 inches) long 602. As shown in FIG. 6, the first edge 105 is 5 inches long 603 and the second edge 106 is 3¾ inches long 604. As shown in FIG. 7, the top 103 and bottom 104 edges are inches wide 701.

Figure 8:
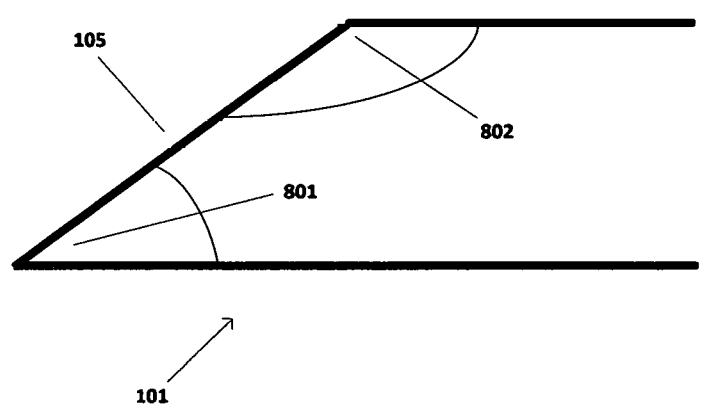
FIG. 8 is a geometric representation of the first edge of the combination measuring tool, indicating its angular measurements.
Figure 9:
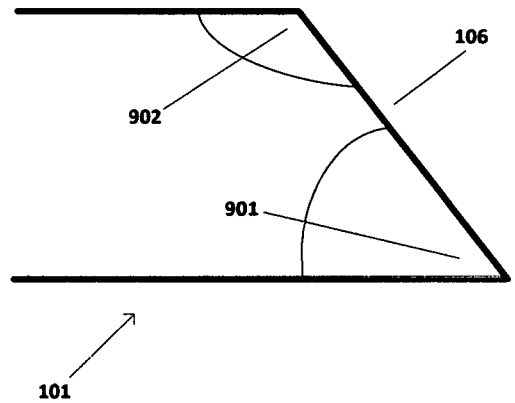
FIG. 9 is a geometric representation of the second edge of the combination measuring tool, indicating it angular measurements.

As shown in FIGS. 1 to 4, the combination measuring tool has tapered first 105 and second 106 edges. FIGS. 8 and 9 show the angles of the first 105 and second 106 edges, respectively. FIG. 8 shows a tapered edge (acute angle) measuring 36.87 degrees (angle a) 801; angle b (obtuse angle) 802 is supplementary to angle a 801 and measures 143.13 degrees. FIG. 9 shows a tapered edge (acute angle) measuring 53.13 degrees (angle c) 901; angle d (obtuse angle) 902 is supplementary to angle c 901 and measures 126.87 degrees.

Figure 10:
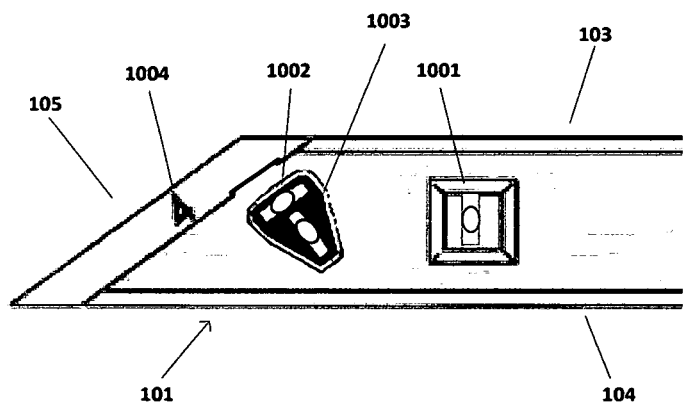
FIGS. 10 and 11 are views of the first edge of the combination measuring tool, as seen from its first and second sides, respectively.
Figure 11:
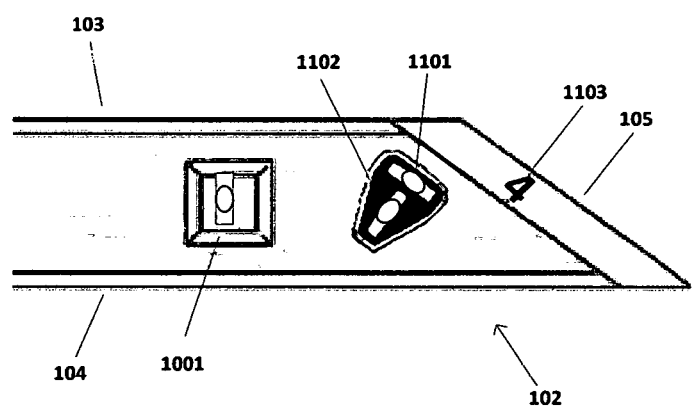
Figure 12:
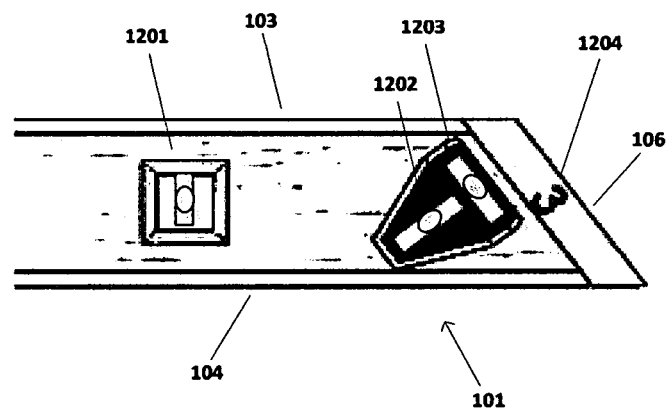
FIGS. 12 and 13 are views of the second edge of the combination measuring tool, as seen from its first and second sides, respectively.
Figure 13:
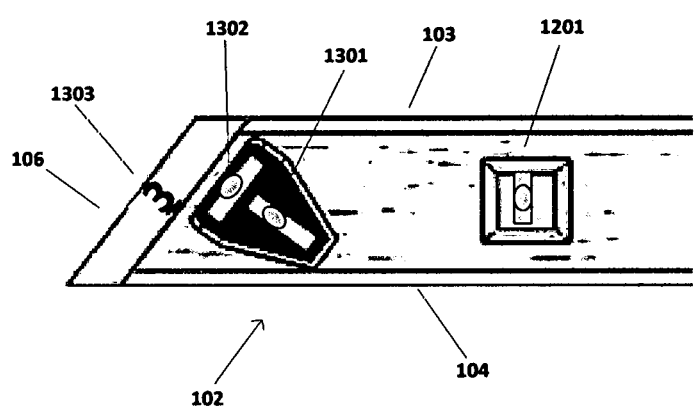

The combination measuring tool contains 15 vials (vials A to O). Vial A 107, shown in FIGS. 1 to 4, is visible on the top edge 103 and the first 101 and second 102 sides. As shown in FIGS. 1 to 4, vial A 107 is centered on the top edge 103 and is parallel to the top 103 and bottom 104 edges. Vial B 1001, shown in FIGS. 10 and 11, and vial C 1201, shown in FIGS. 12 and 13, are visible on the first 101 and second 102 sides. As shown in FIGS. 10 and 11, vial B 1001 is located near the first edge 105 and is perpendicular to the top 103 and bottom 104 edges. As shown in FIGS. 12 and 13, vial C 1201 is located near the second edge 106 and is perpendicular to the top 103 and bottom 104 edges.

As shown in FIG. 10, vials D 1002 and E 1003 are visible on the first side 101 of the combination measuring tool. As shown in FIG. 10, vial D 1002 is parallel to the first edge 105 and vial E 1003 is adjacent and perpendicular to vial D 1002. As shown in FIG. 11, vials F 1101 and G 1102 are opposite vials D 1002 and E 1003, respectively, and are visible on the second side 102. Vial F 1101 is parallel to the first edge 105, and vial G 1102 is adjacent and perpendicular to vial F 1101.

As shown in FIG. 12, vials H 1202 and I 1203 are visible on the first side 101 of the combination measuring tool. As shown in FIG. 12, vial I 1203 is parallel to the second edge 106 and vial H 1202 is adjacent and perpendicular to vial I 1203. As shown in FIG. 13, vials J 1301 and K 1302 are opposite vials H 1202 and I 1203, respectively, and are visible on the second side 102. Vial K 1302 is parallel to the second edge 106, and vial J 1301 is adjacent and perpendicular to vial K 1302.

Figure 2:
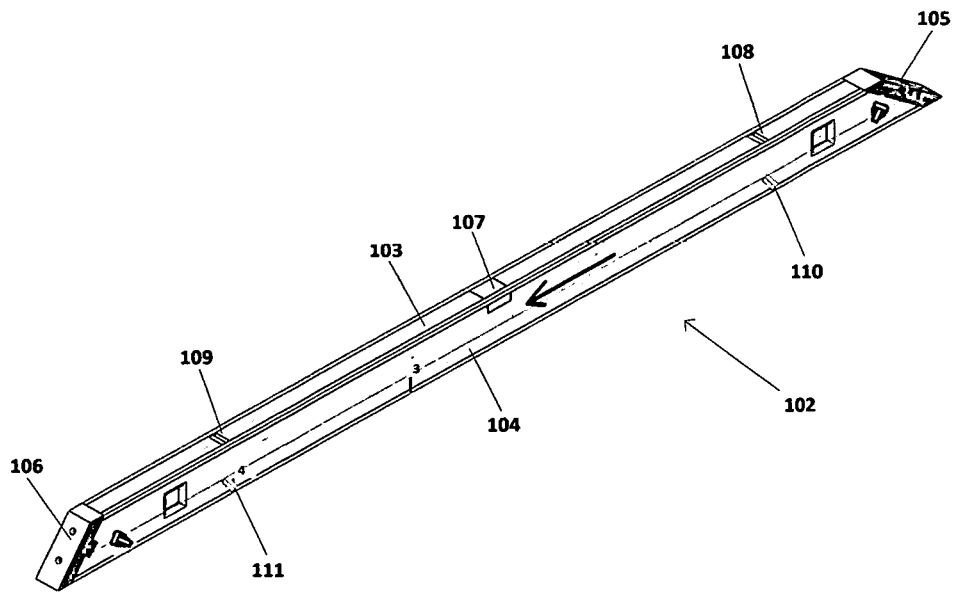
Figure 3:
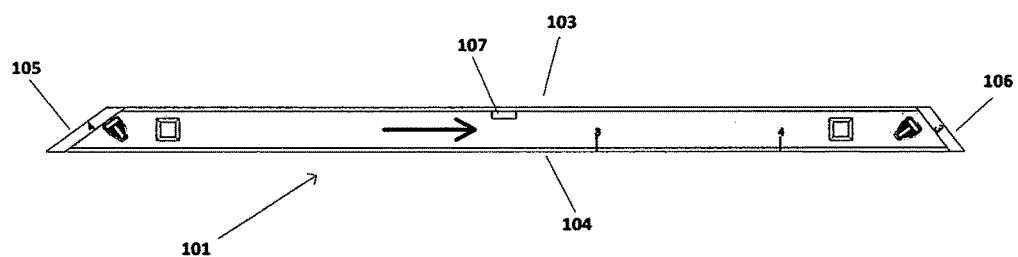
FIGS. 3 and 4 are side views of the combination measuring tool, indicating its first and second sides, respectively; its top and bottom edges; and its first and second edges, respectively.
Figure 4:
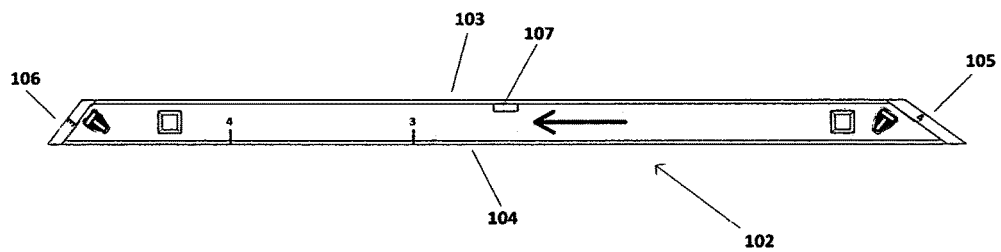

As shown in FIGS. 1 and 2, vials L 108 and M 109 are visible on the top edge 103 of the combination measuring tool. Vials L 108 and M 109 are perpendicular to the length 601 of the top edge 103. As shown in FIGS. 1 and 2, vials N 110 and O 111 are visible on the bottom edge 104 opposite vials L 108 and M 109, respectively. Vials N 110 and O 111 are perpendicular to the length 602 of the bottom edge 104.

Figure 14:
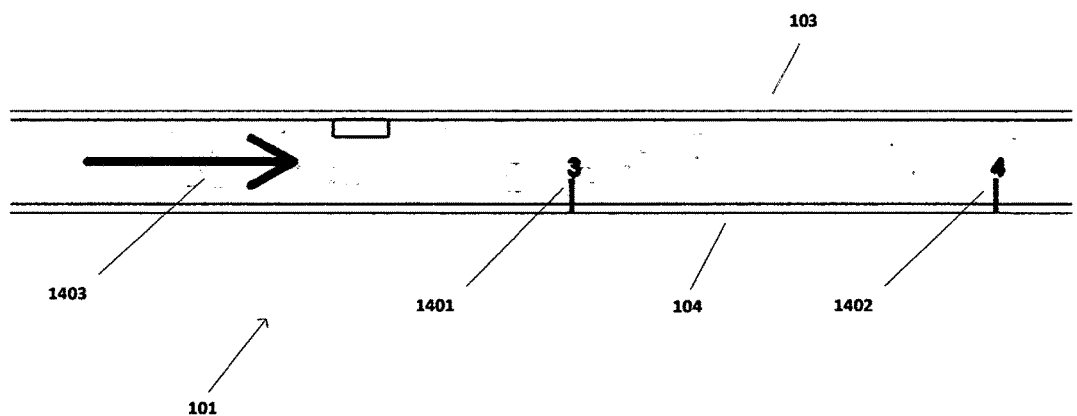
FIGS. 14 and 15 show the numbered markings and directional arrows on the first and second sides, respectively, of the combination measuring tool.

As shown in FIG. 14, to provide quick measurement points on the first side 101 of the combination measuring tool the numeral "3" and a 3-foot mark 1401 and the numeral "4" and a 4-foot mark 1402, as measured from the intersection of the first edge 105 (not shown) and the bottom edge 104 (vertex of angle a 801 [not shown]), are imprinted contiguous and perpendicular to the bottom edge 104.

Figure 15:
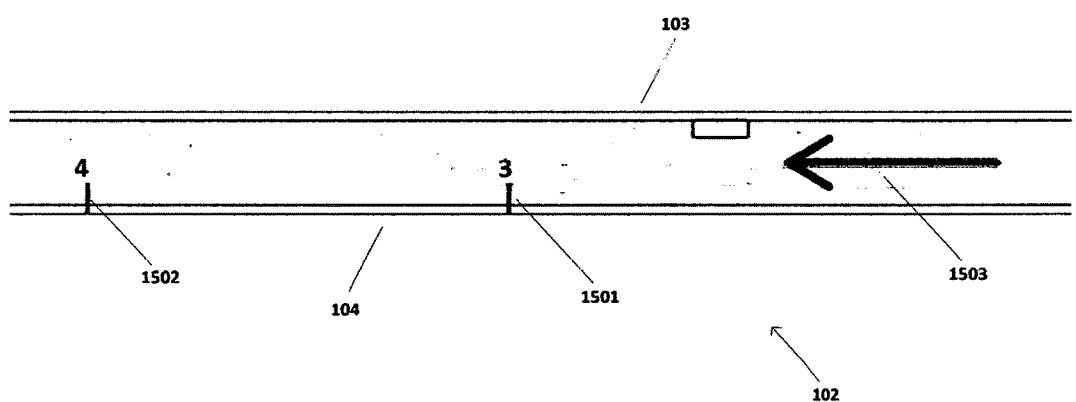

As shown in FIG. 15, to provide quick measurement points on the second side 102 of the combination measuring tool the numeral "3" and a 3-foot mark 1501 and the numeral "4" and a 4-foot mark 1502, as measured from the intersection of the first edge 105 (not shown) and the bottom edge 104 (vertex of angle a 801 [not shown]), are imprinted contiguous and perpendicular to the bottom edge 104.

As shown in FIG. 14, an arrow 1403 is imprinted on the first side 101 of the combination measuring tool parallel to the top 103 and bottom 104 edges and pointing toward the second edge 106 (not shown) to quickly indicate the direction of measurement for the 3- and 4-foot lengths.

As shown in FIG. 15, an arrow 1503 is imprinted on the second side 102 of the combination measuring tool parallel to the top 103 and bottom 104 edges and pointing toward the second edge 106 (not shown) to quickly indicate the direction of measurement for the 3- and 4-foot lengths.

Figure 18:
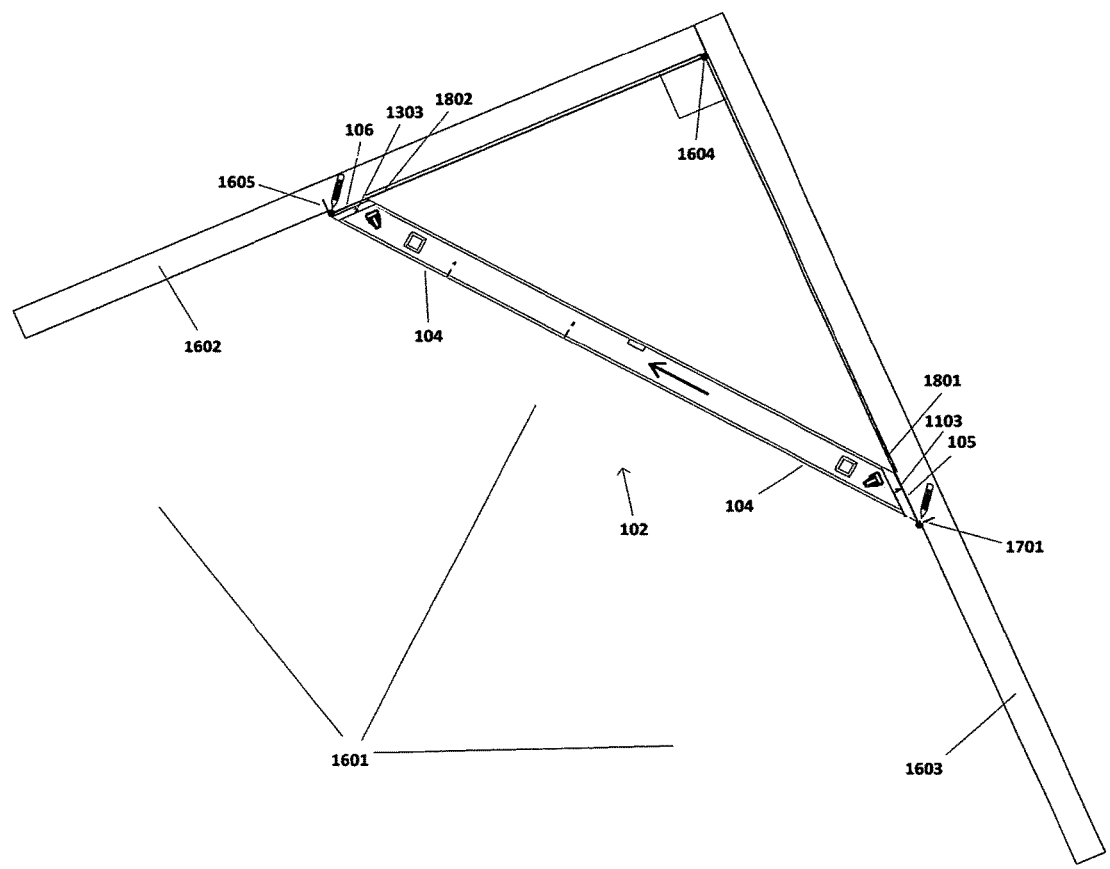
FIG. 18 shows how to confirm a right angle with a combination measuring tool in a horizontal layout.
Figure 21:
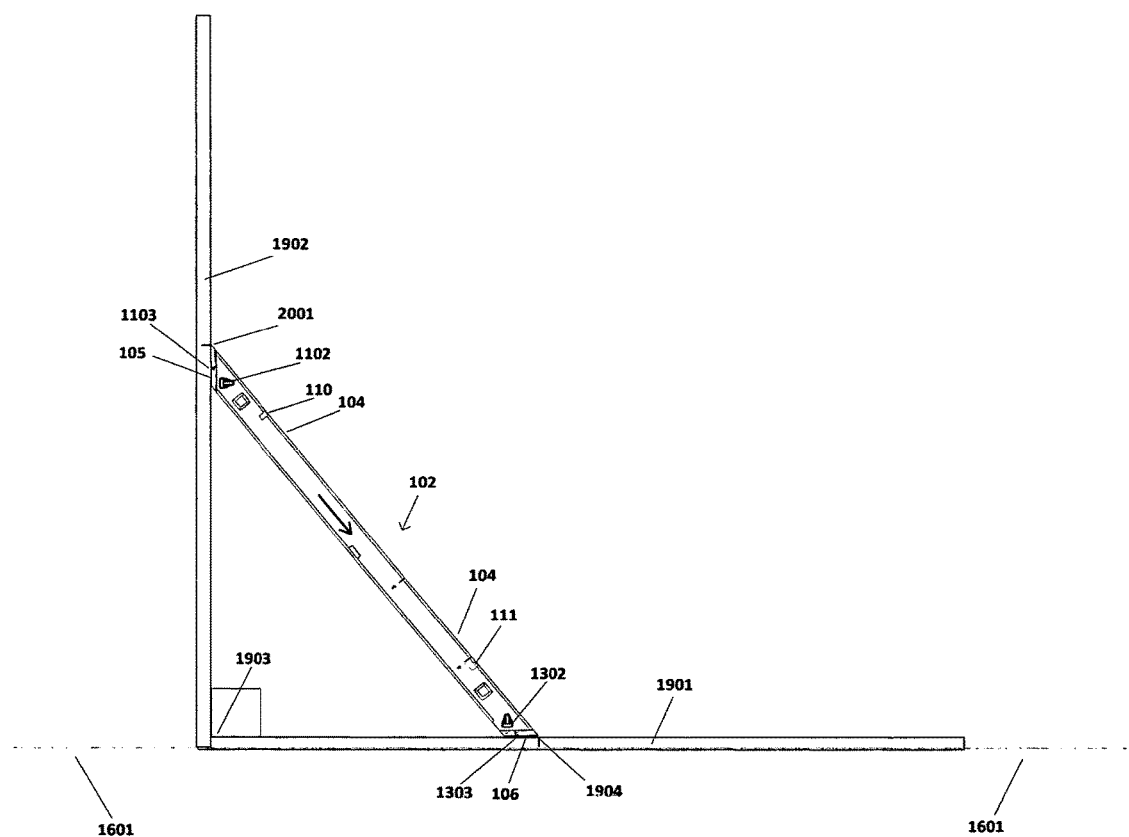
FIG. 21 shows how to confirm a right angle with a combination measuring tool in a joint horizontal and vertical layout.

As shown in FIG. 10, to quickly identify the 4-foot measurement edge in performing the right angle measurements shown later in FIGS. 18 and 21, the numeral "4" 1004 is imprinted obliquely on the first side 101 of the combination measuring tool adjacent and perpendicular to the first edge 105. As shown in FIG. 11, the numeral "4" 1103 is imprinted obliquely on the second side 102 adjacent and perpendicular to the first edge 105 opposite the other numeral "4" 1004.

As shown in FIG. 12, to quickly identify the 3-foot measurement edge in performing the right angle measurements shown later in FIGS. 18 and 21, the numeral "3" 1204 is imprinted obliquely on the first side 101 of the combination measuring tool adjacent and perpendicular to the second edge 106. As shown in FIG. 13, the numeral "3" 1303 is imprinted obliquely on the second side 102 adjacent and perpendicular to the second edge 106 opposite the other numeral "3" 1204.

The combination measuring tool can be built of materials including wood, metal, or plastic.

Operation

Measuring for Horizontalness and Verticalness

As shown in FIGS. 1 to 4, 6, and 10 to 13, the combination measuring tool contains the basic components of a spirit level and can be used to measure long objects, i.e., 5 feet or longer for horizontalness and verticalness. Vial A 107 measures for horizontalness; vials B 1001 and C 1201 measure for verticalness.

Measuring a Right Angle

As shown in FIGS. 1 to 4, 6, and 8 to 15, the combination measuring tool has the basic components and dimensions to measure a right angle for two long intersecting objects, i.e., 5 feet or longer, both horizontally and vertically. FIGS. 5 and 7 show the height 501 and width 701, respectively, of the combination measuring tool. The added height 501 enhances the accuracy of the combination measuring tool by having a proportional effect on the lengths of the first 105 and second edges 106 (603 and 604, respectively) and, thus, the surface contact areas of the objects being measured. The added width 701 of the combination measuring tool allows ample space to insert levels L to O (108 to 111).

Horizontal Layout

The following example is for two unfastened objects, e.g., 2 by 4s (lumber), in the horizontal plane. If preferred, the 4-foot measurement (step 8) can alternate in sequence with the 3-foot measurement (step 4).

Figure 16:
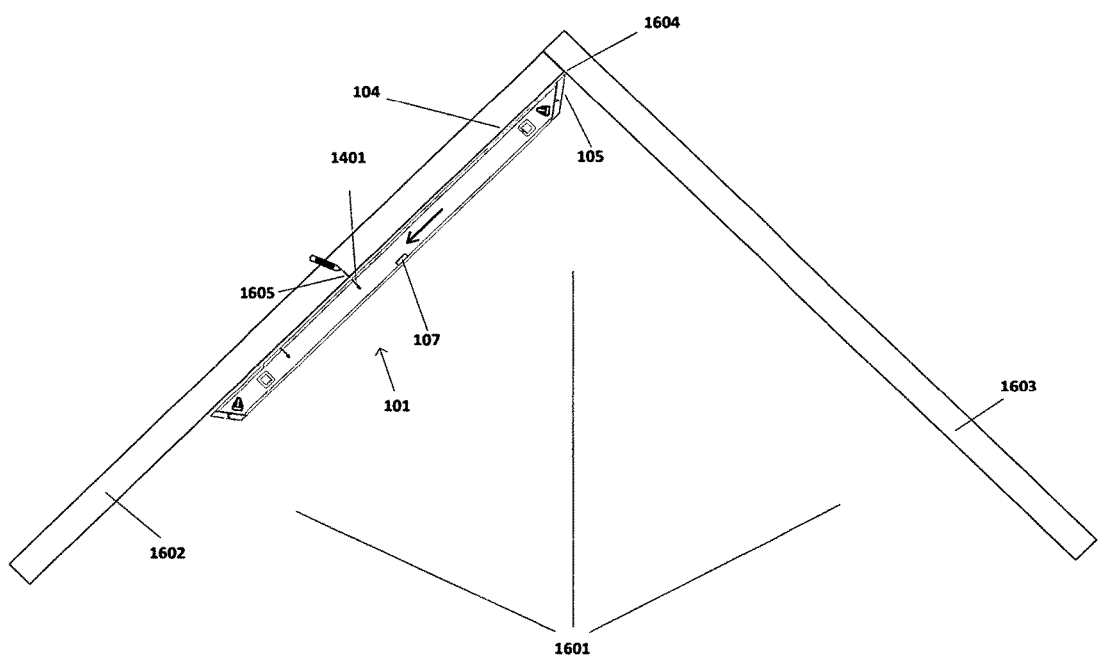
FIG. 16 shows how to perform a 3-foot measurement with a combination measuring tool in a horizontal layout.
Figure 17:
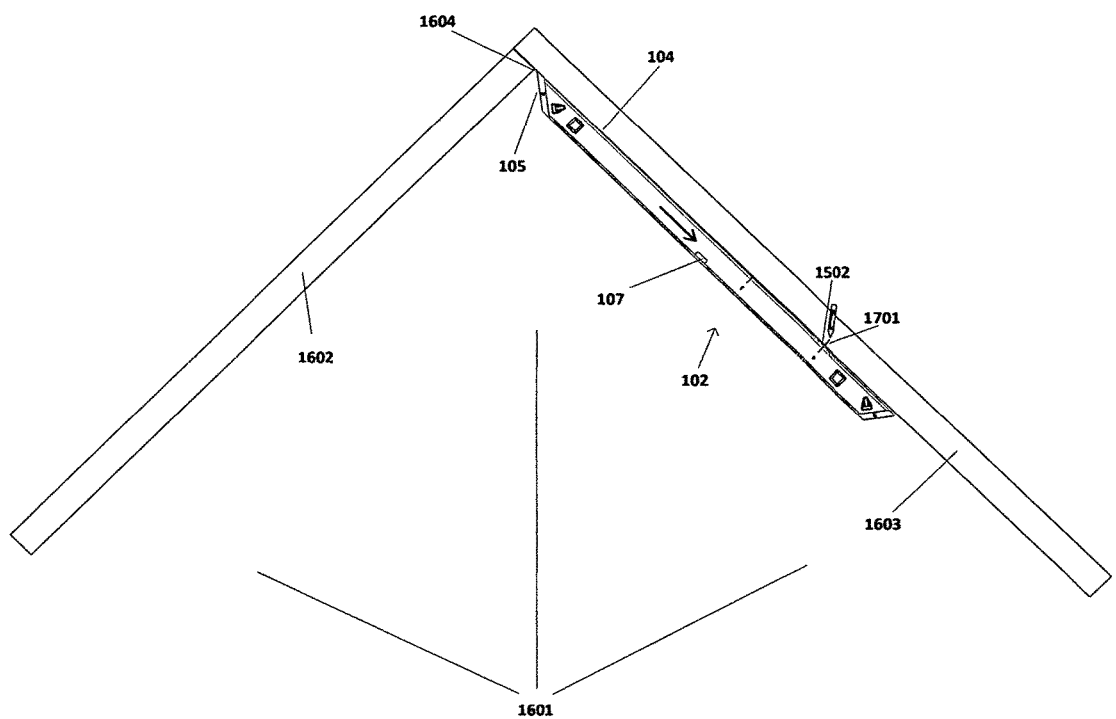
FIG. 17 shows how to perform a 4-foot measurement with a combination measuring tool in a horizontal layout.

1. As shown in FIG. 16, lay the combination measuring tool on a surface 1601 between the two objects (1602 and 1603) being measured for perpendicularity with the first side 101 facing up and the bottom edge 104 flush against the right edge of the first object 1602 being measured.
2. Touch the intersection of the first edge 105 and the bottom edge 104 of the combination measuring tool to the intersection 1604 of the two objects (1602 and 1603) being measured for perpendicularity.
3. Check vial A 107 to determine if the combination measuring tool is horizontal; if necessary, adjust the first object 1602 being measured.
4. Draw a short line 1605 opposite the 3-foot mark 1401 on the combination measuring tool on the right edge of the first object 1602 being measured.
5. As shown in FIG. 17, lay the combination measuring tool on the surface 1601 with the second side 102 facing up with the bottom edge 104 flush against the left edge of the second object 1603 being measured.
6. Touch the intersection of the first edge 105 and the bottom edge 104 of the combination measuring tool to the intersection 1604 of the two objects (1602 and 1603) being measured for perpendicularity.
7. Check vial A 107 to determine if the combination measuring tool is horizontal; if necessary, adjust the second object 1603 being measured.
8. Draw a short line 1701 opposite the 4-foot mark 1502 on the combination measuring tool on the left edge of the second object 1603 being measured.
9. As shown in FIG. 18, lay the combination measuring tool on the surface 1601 with its second side 102 facing up and place the second edge 106 flush against the right edge of the first object 1602 being measured.
10. Touch the intersection of the second edge 106 (highlighted by the numeral "3" 1303) and the bottom edge 104 of the combination measuring tool to the 3-foot line 1605 on the right edge of the first object 1602 being measured.
11. Ensure the first edge 105 of the combination measuring tool is flush against the left edge of the second object 1603 being measured and the intersection of the first edge 105 (highlighted by the numeral "4" 1103) and the bottom edge 104 of the combination measuring tool is touching the 4-foot line 1701 on the left edge of the second object 1603 being measured.
12. Draw a line 1801 on the surface 1601 from the now confirmed right angle intersection 1604 of the two objects (1602 and 1603) being measured for perpendicularity to the top of the first edge 105 of the combination measuring tool.
13. Draw a line 1802 on the surface 1601 from the right angle intersection 1604 of the two objects (1602 and 1603) being measured for perpendicularity to the top of the second edge 106 of the combination measuring tool.
14. Lift the combination measuring tool from the surface 1601.
15. Fasten the two objects (1602 and 1603) being measured for perpendicularity to the surface 1601.
16. Extend the two lines (1801 and 1802) on the surface 1601 to the desired distances.

Joint Horizontal and Vertical Layout

The following example is for two unfastened objects, one in the horizontal plane and one in the vertical plane. If preferred, the 4-foot measurement (step 8) can alternate in sequence with the 3-foot measurement (step 4).

The combination measuring tool can also measure various other horizontal and vertical configurations using vials D 1002, E 1003, F 1101, H 1202, I 1203, and J 1301, depending on which side (101 or 102) of the combination measuring tool is visible and if the horizontal and vertical measurements are reversed from the following example, i.e., the horizontal measurement is 4 feet and the vertical measurement is 3 feet.

Figure 19:
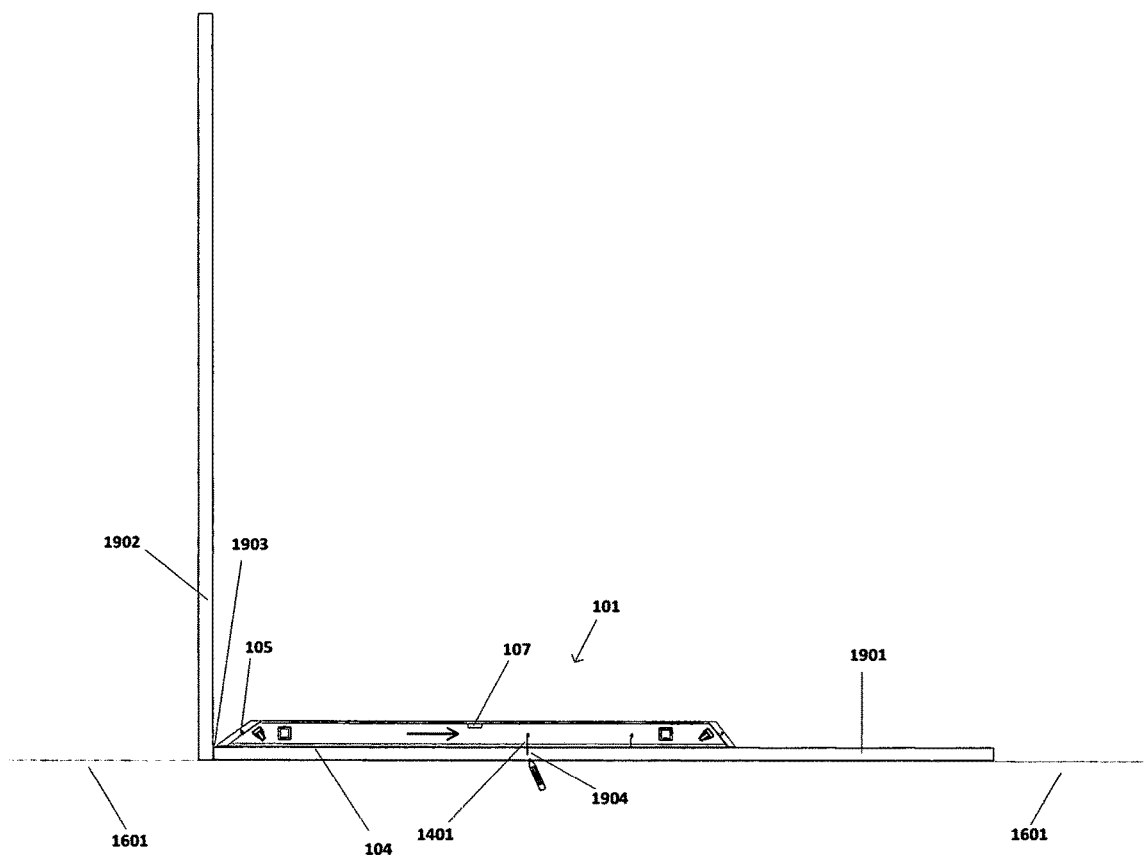
FIG. 19 shows how to perform a 3-foot measurement with a combination measuring tool in a joint horizontal and vertical layout.
Figure 20:
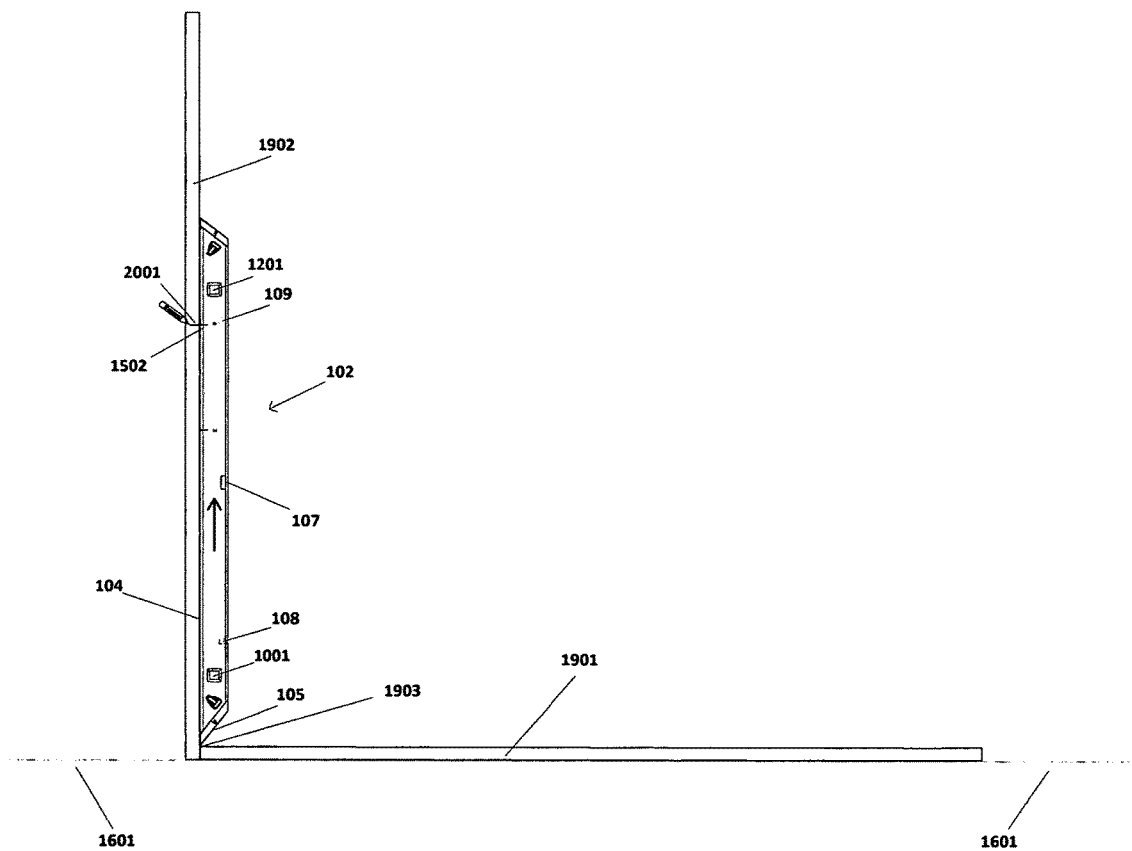
FIG. 20 shows how to perform a 4-foot measurement with a combination measuring tool in a joint horizontal and vertical layout.

1. As shown in FIG. 19, place the combination measuring tool between the two objects (1901 and 1902) being measured for perpendicularity with the bottom edge 104 (first side 101 orientation) flush against the top edge of the first object 1901 being measured.
2. Touch the intersection of the first edge 105 and the bottom edge 104 of the combination measuring tool to the intersection 1903 of the two objects (1901 and 1902) being measured for perpendicularity.
3. Check vial A 107 to determine if the combination measuring tool is horizontal; if necessary, adjust the first object 1901 being measured.
4. Draw a short line 1904 opposite the 3-foot mark 1401 on the combination measuring tool on the side edge of the first object 1901 being measured.
5. As shown in FIG. 20, place the bottom edge 104 (second side 102 orientation) of the combination measuring tool flush against the right edge of the second object 1902 being measured.
6. Touch the intersection of the first edge 105 and the bottom edge 104 of the combination measuring tool to the intersection 1903 of the two objects (1901 and 1902) being measured for perpendicularity.
7. Check vials B 1001, C 1201, L 108, and M 109 to determine if the combination measuring tool is vertical; if necessary, adjust the second object 1902 being measured.
8. Draw a short line 2001 opposite the 4-foot mark 1502 on the combination measuring tool on the side edge of the second object 1902 being measured.
9. As shown in FIG. 21, place the second edge 106 (second side 102 orientation) of the combination measuring tool flush against the top edge of the first object 1901 being measured.
10. Touch the intersection of the second edge 106 (highlighted by the numeral "3" 1303) and the bottom edge 104 of the combination measuring tool to the 3-foot line 1904 on the side edge of the first object 1901 being measured.
11. Ensure the first edge 105 of the combination measuring tool is flush against the right edge of the second object 1902 being measured and the intersection of the first edge 105 (highlighted by the numeral "4" 1103) and the bottom edge 104 is touching the 4-foot line 2001 on the right edge of the second object 1902 being measured.
12. Check vial K 1302 to determine if the combination measuring tool is horizontal with the top edge of the first object 1901 being measured; if necessary, adjust the first object 1901 being measured.
13. Check vial G 1102 to determine if the combination measuring tool is perpendicular with the right edge of the second object 1902 being measured; if necessary, adjust the second object 1902 being measured.
14. Check vials N 110 and O 111 for horizontalness; if necessary, adjust the second object 1902 being measured.
15. The intersection 1903 of the two objects (1901 and 1902) being measured for perpendicularity is now confirmed to be 90 degrees.
16. Vertically brace the second object 1902 being measured.
17. Fasten the first object 1901 being measured to the surface 1601.

LIST OF REFERENCE NUMERALS

101—First Side of Combination Measuring Tool
102—Second Side of Combination Measuring Tool
103—Top Edge of Combination Measuring Tool
104—Bottom Edge of Combination Measuring Tool
105—First Edge of Combination Measuring Tool
106—Second Edge of Combination Measuring Tool
107—Vial A
108—Vial L
109—Vial M
110—Vial N
111—Vial O
501—Height of Combination Measuring Tool
601—Length of Top Edge of Combination Measuring Tool
602—Length of Bottom Edge of Combination Measuring Tool
603—Length of First Edge of Combination Measuring Tool
604—Length of Second Edge of Combination Measuring Tool
701—Width of Top and Bottom Edges of Combination Measuring Tool
801—Angle a
802—Angle b
901—Angle c
902—Angle d
1001—Vial B
1002—Vial D
1003—Vial E
1004—Numeral "4" (First Side)
1101—Vial F
1102—Vial G
1103—Numeral "4" (Second Side)
1201—Vial C
1202—Vial H
1203—Vial I
1204—Numeral "3" (First Side)
1301—Vial J
1302—Vial K
1303—Numeral "3" (Second Side)
1401—3-Foot Numeral and Mark (First Side)
1402—4-Foot Numeral and Mark (First Side)
1403—Arrow (First Side)
1501—3-Foot Numeral and Mark (Second Side)
1502—4-Foot Numeral and Mark (Second Side)
1503—Arrow (Second Side)
1601—Surface
1602—First Object Being Measured (Horizontal Layout)
1603—Second Object Being Measured (Horizontal Layout)
1604—Intersection of Two Objects Being Measured (Horizontal Layout)
1605—3-Foot Line on First Object Being Measured (Horizontal Layout)
1701—4-Foot Line on Second Object Being Measured (Horizontal Layout)
1801—Line Drawn on Surface From Right Angle Intersection to Top of First Edge
1802—Line Drawn on Surface From Right Angle Intersection to Top of Second Edge
1901—First Object Being Measured (Joint Horizontal and Vertical Layout)
1902—Second Object Being Measured (Joint Horizontal and Vertical Layout)
1903—Intersection of Two Objects Being Measured (Joint Horizontal and Vertical Layout)
1904—3-Foot Line on First Object Being Measured (Joint Horizontal and Vertical Layout)
2001—4-Foot Line on Second Object Being Measured (Joint Horizontal and Vertical Layout)

The invention claimed is:
1. A trapezoid-shaped combination level and right angle measuring tool, comprising:
 a. one or more vials;
 b. parallel, unequal in length top and bottom edges;
 c. oblique, unequal in length first and second edges on opposite ends of the top and bottom edges; and
 d. wherein a first angle of the trapezoid equals a first acute angle of a 3-4-5 ratio Pythagorean triangle and a second angle of the trapezoid equals a second acute angle of the 3-4-5 ratio Pythagorean triangle;
 whereby the unique trapezoid shape of said combination level and right angle measure tool provides an efficient means for measuring a right angle.

* * * * *

UNITED STATES PATENT AND TRADEMARK OFFICE
CERTIFICATE OF CORRECTION

PATENT NO. : 9,778,034 B2
APPLICATION NO. : 15/078694
DATED : October 3, 2017
INVENTOR(S) : Walter Wells Rice Page 1 of 1

It is certified that error appears in the above-identified patent and that said Letters Patent is hereby corrected as shown below:

In the Specification

- Column 3, Line 53: --1½"-- has been omitted and should be inserted after "are" and before "inches"
- Column 5, Lines 8 and 9: "materials including" should be deleted In the Claims

- Column 8, Line 62: "trapezoid" should be "trapezoidal"
- Column 8, Line 63: "measure" should be "measuring"

Signed and Sealed this
Fifth Day of December, 2017

Joseph Matal
*Performing the Functions and Duties of the
Under Secretary of Commerce for Intellectual Property and
Director of the United States Patent and Trademark Office*